March 21, 1944. W. B. BOICE 2,344,502
WOODWORKING MACHINE
Original Filed March 17, 1939
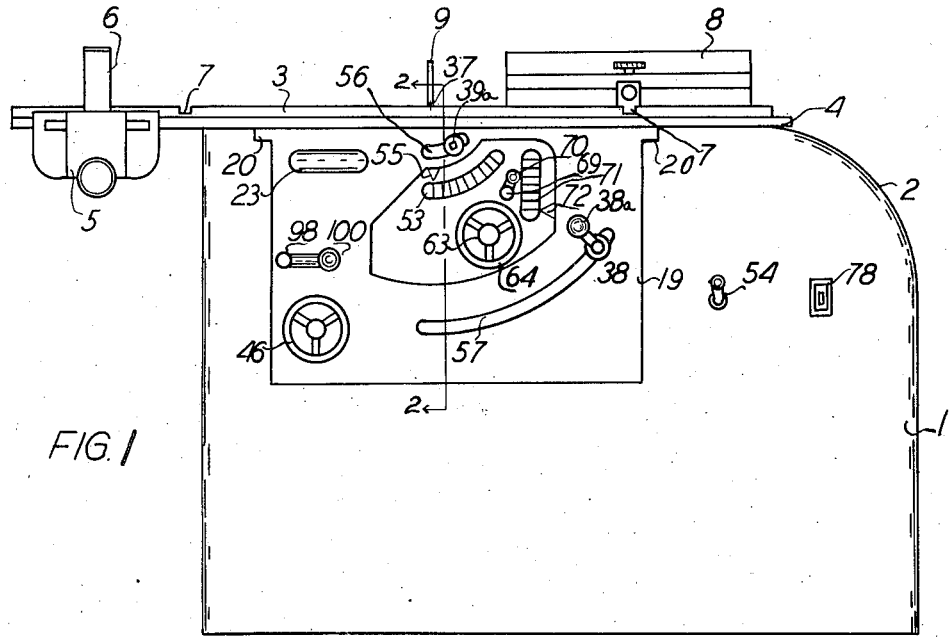
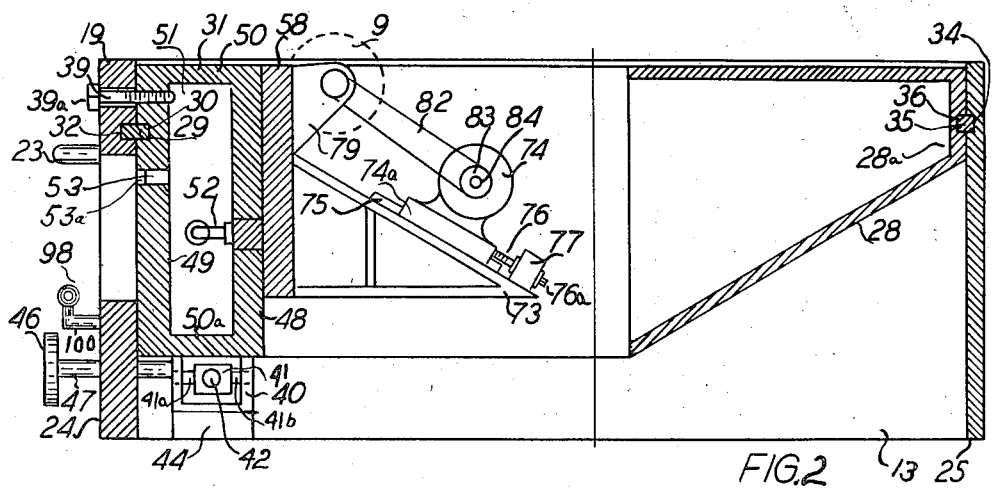
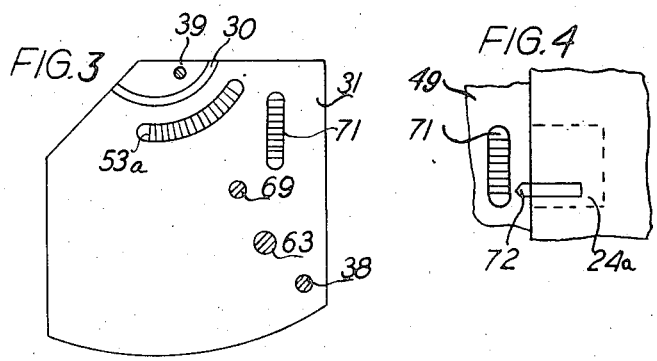
Inventor
WILLIAM B. BOICE
Alfred F. Dees
Attorney Patented Mar. 21, 1944

2,344,502

UNITED STATES PATENT OFFICE 2,344,502

WOODWORKING MACHINE

William B. Boice, Toledo, Ohio

Original application March 17, 1939, Serial No. 262,432. Divided and this application March 10, 1942, Serial No. 434,152

2 Claims. (Cl. 143—36)

This invention is directed to wood working machinery and in its more specific aspects relates to a sawing machine capable of making a plurality of bevel or straight cuts as either a cut off saw or as a rip saw and to an improved dial system and an illumination system therefor.

The object of this invention is to provide an easily read set of illuminated indicators to enable the operator of the machine to accurately determine the bevel, or depth of cut desired.

A further object of the invention is to provide a machine tool with illuminated dials to facilitate machine part adjustments.

Another object of the invention is to provide a wall structure with translucent inserts back of which a source of illumination is placed such that numerals on the inserts may be more easily read.

A still further object of the invention is to reduce the cost of manufacture of a bevel cutting pull saw and which will simultaneously increase the efficiency of the machine and the accuracy of the cutting operation.

Further objects of the invention will occur to those skilled in the arts to which this invention pertains as the description proceeds which taken in connection with the accompanying drawing sets forth a preferred embodiment thereof but such disclosure is not to be construed as a limitation of the invention which is limited only by the appended claims and any and all modifications, alterations and variations of structure coming within the spirit and scope thereof are deemed to be included herein.

In the drawing:

Fig. 1 shows a front elevational view of a machine incorporating the invention.

Fig. 2 is sectional view taken along the line 2—2 of Fig. 1.

Fig. 3 shows a detail on the illuminated dial wall.

Fig. 4 shows an enlarged detail of one of the dial and pointer mechanisms.

This invention is a division of application S. N. 262,432 filed March 17, 1939.

The construction of wood working and other machine tools involves a variety of adjustable elements to enable the operator to produce a variety of controlled bevel and depth cuts and in numerous instances the control levers and dials must be placed in relatively inaccessible places which under normal conditions by reason of dust, cuttings and oils, etc., it frequently becomes difficult to make accurate adjustments of the machine parts. The instant invention aims to provide a machine structure that enables the operator to make a quick accurate adjustment of the several machine parts by reason of easily readable translucent dials that are not obscured by dust, cuttings or oil that may be present on the dials even when they are placed in dark relatively inaccessible places.

The above objects are incorporated in a machine structure comprising a rectangular base structure 1 having a curved surface 2 and over which is fitted a table top or work supporting surface 3. Secured to the front edge of the table top 3 is a fence support or bar 4 on which fence housing 5 is adapted to slide and to which fence 6 is secured. Further details on the construction of the fence may be found in U. S. Patent No. 2,256,607. The table top 3 has a pair of channels or grooves 7, 7 formed therein adapted to receive the tongue of a miter guide 8.

The base 1 is provided with a longitudinal channel in which a carriage 19 is adapted to move axially of itself. The carriage 19 is provided with projections 20, 20 that cooperate with appropriate ways formed in the base 1. The carriage may be made up in the form of a box having end walls 24 and 25 between which appropriate side walls 13 are connected, only one of which is shown in Fig. 2. The forward wall is appropriately apertured through which appropriate controls extend and which exposes illuminated dials to inform the operator of the positional adjustment of the saw or cutter 9 with respect to the upper plane of the table top 3.

The carriage 19 is adapted to be reciprocated in the channel of base 1 by means of handle 23 and disposed within the carriage 19 is a cutter carrier 28 which has an end wall 28a and a forward hollow wall of the box type, 31, which comprises upper and lower portions 50 and 50a and end portions 48 and 49. The carrier 28 has a sloping wall as shown which blends into side walls that join the box wall 31 and the other end wall 28a.

The carrier 28 is swingably mounted in the carriage 19 on an axis 37 that lies in the plane of the table top 3 and in the plane of the saw or cutter 9. The end walls and wall portions 24, 25, 28a, and 49 are grooved as at 30, 32, 34 and 36 to receive bearing elements 29 and 35 curved about axis of rotation 37. Further structural details of the bearing elements are set forth in U. S. Patent No. 1,922,151. The wall 24 is provided with curved slots 56 and 57 about 37 as a center which receive lock elements 39, 39a and 38, 38a. These locks are adapted to hold the carrier in any angularly adjusted position.

The angular adjustment is made by means of hand wheel 46 rotating 47 that is operatively associated with parts 40, 41, 41a, 41b, 42 and 44 all of which are more specifically detailed as to construction and operation in the application referred to above. The wall 49 is provided with a curved slot 53 about 37 as a center and into which a translucent indicia plate insert 53a is arranged and with which pointer 55 on wall 24 cooperates to inform the operator of the angle of tilt of the same. The markings on the insert 53a are preferably in degrees to facilitate reading.

The wall 48 mounts a vertically movable cutter support 58 whose base rests against the wall 48. Attention is especially invited to the fact that this movement is radial with reference to axis 37. The cutter 9 is rotatably mounted on the bracket 79 and the motor 74 is supported on a base 74a cooperating with a slide 75 fixed to a bracket 73 secured to the base of support 58. Pulley 83 is fixed to armature shaft 84 and a belt 82 transmits power from motor 74 to saw 9. The belt 82 is tensioned by means of elements 76, 76a and 77.

Appropriate mechanism for vertically or axially moving the cutter 9 originates with handwheel 64 mounted on a shaft 63 that connects with gearing (not shown) to vertically or axially move support 58. 69 and 70 actuate a lock (not shown) to hold the support 58 in a selected adjustment. Wall 49 has a vertical slot formed therein that receives a translucent insert 71 which is preferably graduated in inches and indicates the distance cutter 9 extends above the table top 3. Wall 24 is slotted as at 24a to receive a pointer 72 connected directly to the support 58. The exact mechanical details are more particularly set forth of all the adjustments in the application referred to above.

Arranged in the space 51 of wall 31 is a lamp 52 removably secured therein and controlled by a switch 54. Light from the lamp makes the indicia on inserts 71 and 53a show up clearly even if grime and dust do partially cover the inserts. 78 is a control switch for the motor 74 and 98, 100 are lock actuators for a lock (not shown) to hold carriage 19 at rest in base 1 whenever a ripping operation is performed on the machine.

That which is regarded new, novel and useful and which is sought to be protected by Letters Patent of the United States is as follows:

1. In a sawing machine, the combination; a carriage longitudinally movable in a machine base toward and away from the normal position of the operator of the machine and said carriage having a carriage end normally faced by said operator, said carriage end having an arcute opening in it; a carrier transversely swingable of said carriage end and having a hollow end wall adjacent said carriage end; a cutter support radially movable with respect to the axis of swing of said carrier and mounted on said carrier adjacent said hollow end wall; indexed translucent dials on the face of said hollow end wall adjacent said carriage end; said dials positioned back of the arcuate opening in said carriage end and cooperating with means on the carriage and on the cutter support to show the adjustment respectively of said carrier angularly of said carriage and of said cutter support radially of said carrier; and illuminating means within said hollow wall for lighting up said translucent dials and showing the adjustment readings on said dials through said opening.

2. In a cutting machine, the combination; a machine base in which a carriage is longitudinally movable of itself in said base toward and away from the operator's position and said carriage having an end normally faced by the operator, said carriage end having an opening in it; a carrier swingable relatively of said carriage and having a hollow end wall adjacent said carriage end; a cutter support radially movable with respect to the axis of swing of said carrier and supported on said carrier adjacent said hollow end wall; indexed translucent dials fixed in the face of said hollow end wall adjacent said carriage end; said dials positioned back of said opening, and cooperating with means on the carriage and on the cutter support to show the adjustment respectively of said carrier angularly of said carriage and of said cutter support radially of said carrier; and illuminating means within said hollow wall to illuminate said dials to show the several adjustment readings.

WM. B. BOICE.